(12) United States Patent
Klausgrete

(10) Patent No.: US 7,924,543 B2
(45) Date of Patent: Apr. 12, 2011

(54) CURRENT-LIMITING CIRCUIT WITH ADDITIONAL CURRENT PATH

(75) Inventor: Dieter Klausgrete, Goettingen (DE)

(73) Assignee: Sartorius AG, Goettingen (DE)

( * ) Notice: Subject to any disclaimer, the term of this patent is extended or adjusted under 35 U.S.C. 154(b) by 306 days.

(21) Appl. No.: 12/314,249

(22) Filed: Dec. 5, 2008

(65) Prior Publication Data

US 2009/0147426 A1    Jun. 11, 2009

(30) Foreign Application Priority Data

Dec. 5, 2007  (DE) .................. 10 2007 058 877

(51) Int. Cl.
*H02H 3/08* (2006.01)
*H02H 9/02* (2006.01)
(52) U.S. Cl. .................. 361/93.1; 361/58; 323/277
(58) Field of Classification Search ............. 361/93.1, 361/18, 58, 93.9, 101, 100; 323/277, 278; 307/24, 31, 52, 131
See application file for complete search history.

(56) References Cited

U.S. PATENT DOCUMENTS

| 3,303,388 | A | * | 2/1967 | Means ........................... 361/18 |
| 3,643,151 | A | * | 2/1972 | Matsushima et al. ......... 323/277 |
| 4,161,760 | A | * | 7/1979 | Valentine ....................... 361/18 |
| 4,530,023 | A | * | 7/1985 | Brown ............................ 361/58 |
| 4,845,584 | A | * | 7/1989 | Numata .......................... 361/57 |
| 5,550,700 | A | * | 8/1996 | Moore et al. ................. 361/101 |
| 2004/0080892 | A1 | | 4/2004 | Popescu-Stanesti et al. |

FOREIGN PATENT DOCUMENTS

DE    38 14 251 C1    6/1989
WO       0017981      3/2000

* cited by examiner

*Primary Examiner* — Patrick Salce
(74) *Attorney, Agent, or Firm* — Sughrue Mion, PLLC

(57) ABSTRACT

A current-limiting circuit (100), which limits an electrical current from a voltage source to a consumer to a predetermined maximum current. A measuring resistor (110) is coupled into a current lead (103) between a circuit input (102) and a circuit output (104). A transistor (106) of the circuit is coupled into the current lead (103) with its collector-emitter path in series with the measuring resistor (110), and its base is connected to the current lead (103) through a series resistor (108). A shunt regulator (116) of the circuit has an anode, a reference input and a cathode, wherein the cathode is connected to the base of the transistor (106), and the anode and the reference input form a voltage tap across the measuring resistor (110). An additional, high-ohmic current path extends in parallel to the transistor (106) and includes a component connected reverse-biased having a diode characteristic and an auxiliary measuring resistor (120b), wherein the auxiliary measuring resistor (120b) is integrated in the voltage tap.

7 Claims, 1 Drawing Sheet

CURRENT-LIMITING CIRCUIT WITH ADDITIONAL CURRENT PATH

The following disclosure is based on German Patent Application No. DE 10 2007 058 877.3, filed on Dec. 5, 2007, which is incorporated into this application by reference.

FIELD AND BACKGROUND OF THE INVENTION

The invention relates to a current-limiting circuit, which limits an electrical current from a voltage source to a consumer to a predetermined maximum current. Such a circuit includes a measuring resistor coupled into a current lead between a circuit input and a circuit output, a transistor, which is coupled into the current lead with its collector-emitter path in series with the measuring resistor and whose base is connected to the current lead through a series resistor, and a shunt regulator with an anode, a reference input and a cathode, wherein the cathode is connected to the base of the transistor, and the anode and the reference input form a voltage tap across the measuring resistor.

These types of circuits are frequently pointed out as typical examples of the application of shunt regulators, which are also called controllable diodes. Such circuits are also frequently called constant current sources although this designation is appropriate only when the power requirement of the consumer corresponds to or exceeds the predetermined maximum current. When the consumer has a lower power requirement, the circuit delivers only the lower, required current.

FIG. 2 shows a schematic representation of a generic circuit. The circuit 200 is suitable for limiting the current flow between a voltage source, which can be connected to circuit input 202, and a consumer, which can be connected to the circuit output 204, to a predetermined maximum current. This means that the circuit 200 lets any current required that is below the maximum current pass through. However, the circuit 200 limits the actually delivered current to the maximum current when the current requirements are higher, as could occur when there is a short circuit in the consumer, for example. This satisfies an important requirement for the power supply of consumers in an explosion-prone environment, because sparking or overheating of components due to excessive current flow can be reliably prevented in this manner.

The collector-emitter path of a transistor 206 is connected between the circuit input 202 and the circuit output 204. A series resistor 208, which is connected between the circuit input 202 and the base of the transistor 206, generates the base current on the collector-base path needed to control the transistor 206.

A measuring resistor 210 is connected downstream to the emitter of the transistor 206. Two branches 212, 214 of a voltage tap detect the voltage drop across the measuring resistor 210, wherein the branch 214, which is mounted downstream of the measuring resistor 210, is connected to the anode and the branch 212, which is mounted upstream of the measuring resistor 210, is connected to the reference input of a shunt regulator 216. The cathode of the shunt regulator 216 is connected to the base of the transistor 206. In the context of this application, a shunt regulator is generally understood to mean an electronic component that detects a voltage between its anode and its reference input and delivers a current correlated with the applied voltage to its cathode when a predefined reference voltage is exceeded. The cathode does not deliver any current below the predefined reference voltage. Such components, which are also known as controllable diodes, can be obtained, for example, from Semiconductor Components Industries, LLC under the designation TLV431A. Components with essentially the same effect can likewise be obtained from other manufacturers under other designations.

The voltage source delivers to the consumer the current required by the consumer below the allowable maximum current across the collector-emitter path of the transistor 206 and the measuring resistor 210. The shunt regulator 216 is not active in this type of normal operation, i.e., the base current of the transistor 206 is determined solely by the voltage at the circuit input 202 and by the series resistor 208. If a short circuit occurs in the consumer, the current through the transistor 206 and the measuring resistor 210 rises. The voltage drop across the measuring resistor 210 also grows. As soon as the voltage drop across the measuring resistor 210 exceeds the reference voltage of the shunt regulator 216, the shunt regulator connects through and its cathode extracts current from the base of the transistor 206. The transistor 206 therefore reduces the current flow on the collector-emitter path so far until the voltage drop across the measuring resistor 210 corresponds to the reference voltage of the shunt regulator 216. The current to the consumer is thereby limited to the allowable maximum current.

One disadvantage in this circuit is the high power loss at the transistor 206 in the event of a short circuit when the transistor must conduct maximum current. When supplying consumers in an explosion-prone environment, the power losses that occur in normal operation are in the range of at most ⅔ of the allowable maximum power. This means that a transistor optimally dimensioned for normal operation will be overloaded when conducting the maximum current in the event of a short circuit. Permanent overloading can result in destruction of the transistor, causing it to fully connect through and resulting in an impermissibly high current in the consumer. This can in turn lead to destruction of the consumer or to undesirable sparking or heating in the explosion-prone environment.

A remedy can be created by dimensioning the transistor large, which is not optimized for the power losses occurring in normal operation but for the maximum power. But this leads to disadvantages in the normal operation of the consumer, higher costs, and technical problems in mounting printed circuit boards, for example when the dimensions achievable in SMD construction are exceeded. Alternatively, the transistor can be protected with a thermocontroller that opens, e.g., a mechanical switch, when the transistor overheats. But this solution is expensive and exhibits an undesired time delay. In addition, such a circuit can as a rule be restored to its original state again only by specially trained specialists after the short circuit is resolved and therefore represents an annoyance for the user, especially for short-term short circuits such as occur when connecting a consumer.

OBJECT OF THE INVENTION

One object of the present invention is to further develop a generic current-limiting circuit such that overloading of the transistor in the event of a short circuit in the consumer is excluded in an inexpensive and reversible manner.

SUMMARY OF THE INVENTION

According to one inventive arrangement, an additional current path is provided that is in parallel to the transistor and includes a component connected reverse-biased and having a diode characteristic and an auxiliary measuring resistor, wherein the auxiliary measuring resistor is integrated in the voltage tap.

One basic aspect of the invention is to provide the circuit with an additional, preferably high-ohmic current path, which bypasses the transistor and increases the voltage drop across the measuring resistor "seen" by the shunt regulator in the event of the overcurrent.

This is achieved in that a component having a diode characteristic, such as a Z diode or more preferably another shunt regulator, is provided in the additional current path. This component is disposed in parallel to the transistor to be unloaded. No current flows through this component during normal operation of the consumer, because the voltage drop between collector and emitter of the transistor is smaller than the zener voltage of this component. This means in particular that the first shunt regulator "sees" only the voltage drop across the measuring resistor during normal operation. In this operating mode, the auxiliary measuring resistor is "invisible" to the first shunt regulator, because no or at most a negligible current flows through the auxiliary resistor due to the high-ohmic voltage-tap input of the shunt regulator. If, in case of a short circuit in the consumer or, more generally, when the consumer requires more current than the set maximum current of the current limit, the voltage drop across the transistor increases so far that the reference or breakdown voltage of the component having the diode characteristic and disposed in the additional current path is exceeded, this component connects through so that a non-negligible current also flows through the additional measuring resistor. The voltage drop "seen" by the first shunt regulator thereby also increases by the voltage drop across the additional measuring resistor, causing the first shunt regulator to drive the transistor to a reduced current flow below the maximum current by means of the transistor's base current. If the voltage drop across the additional component having a diode characteristic decreases, this component again inhibits the additional current path so that the entire device can again work in normal operation. In normal operation, the current required by the consumer can thus fluctuate over the entire allowable range; when there is a short circuit, the transistor will however not be continuously loaded with maximum current.

The auxiliary measuring resistor is preferably integrated into the voltage tap branch connected to the reference input of the first shunt regulator, i.e., in the preferred embodiment of the invention, the first pole of the auxiliary measuring resistor is preferably connected to the reference input and its second pole is connected to the emitter.

An auxiliary series resistor, which together with the auxiliary measuring resistor determines the current flow in the additional current path, is preferably connected upstream of the component that has a diode characteristic, it being possible to adjust this current flow very precisely in this manner. It is possible to adapt the protective effect (reduction of the output current) for the transistor in an optimal manner so that as much current as possible can still be allowed through.

As mentioned, the component having a diode characteristic and disposed in the additional current path can preferably be designed as a Z diode or as another shunt regulator. In the latter case, it is preferable for the reference input of the second shunt regular to be back-coupled to its cathode.

Two independently working current-limiting circuits are demanded for typical circuits for supplying power to consumers in an explosion-prone environment. It is possible and preferable to connect two circuits according to the invention in series so that the second circuit ensures a reliable current limit if one circuit fails. However, this means that the current from the current source to the consumer must pass through two measuring resistors. This results in a double voltage drop in comparison to a single current-limiting circuit. Since modern shunt regulators have at least a reference voltage of 1.2 volts, the resistance value of a measuring resistor is typically of the order of magnitude of at least 10 ohm. Two current-limiting circuits according to the invention connected in series therefore typically offer a resistance of at least 20 ohm against the current to be conducted. Since the reduction of all voltages involved in a circuit is a basically worthwhile goal in regard to the size dimensioning of the involved components and the energy consumption, a 20-ohm resistor dedicated only to the safety of the circuit represents a non-negligible magnitude. To achieve an improvement in this case, a further development of the invention provides for a circuit system that includes at least two inventive current-limiting circuits, wherein the collector-emitter paths of their transistors are connected to one another in series and wherein the voltage taps formed by the anodes and reference inputs of both circuits tap the voltage drop across the same measuring resistor. This measure makes it possible to greatly reduce (nearly halve) the voltage drop of the circuit system in normal operation relative to the pure series circuit of two identical current-limiting circuits. At the same time, such a circuit offers no disadvantage in regard to explosion protection, because the mutually used resistor is the critical component in contrast to the active elements of the circuit. It is necessary only to take care not to choose as the mutual measuring resistor a resistor type that becomes low-ohmic in the event of damage. Carbon resistors are therefore preferably to be avoided. Wire-wound or metal-film resistors in particular have proven themselves to be favorable resistor types.

BRIEF DESCRIPTION OF THE DRAWINGS

These and further characteristics and advantages are described below in greater detail with reference to exemplary embodiments and the drawings, in which.

DETAILED DESCRIPTION OF THE EMBODIMENTS

Figure 1:
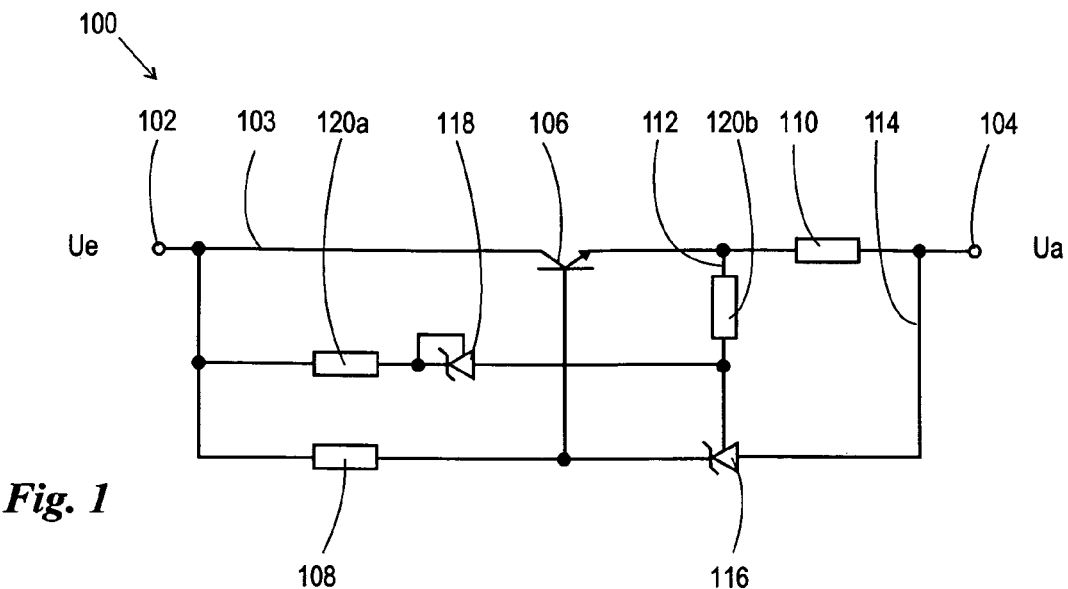
FIG. 1 shows a current-limiting circuit according to the invention.
Figure 2:
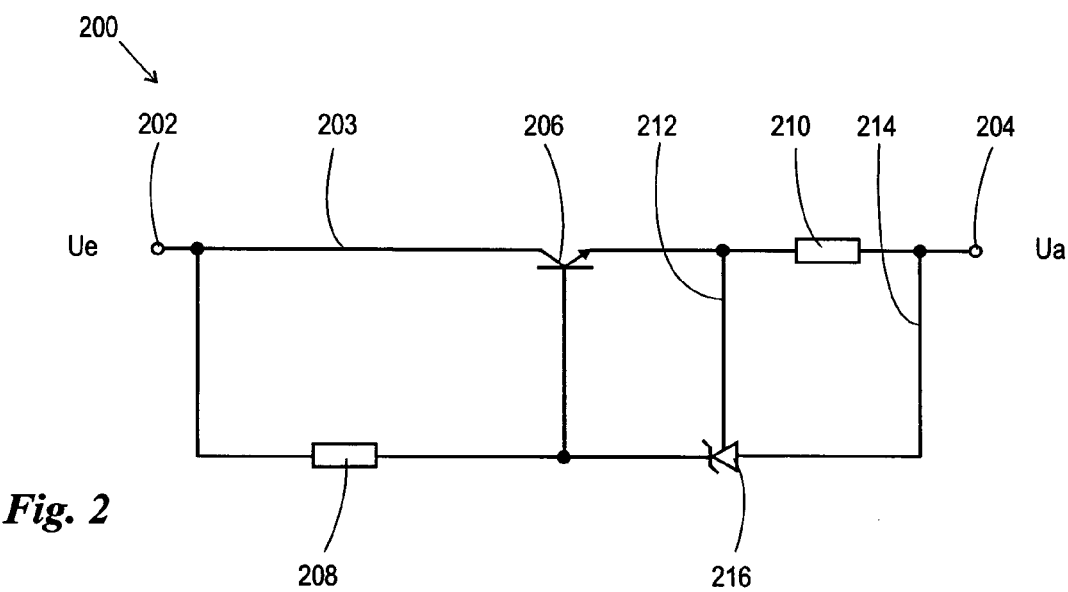
FIG. 2 shows a representative current-limiting circuit according to the state of the art.

FIG. 1 shows a current-liming circuit 100 according to the invention. The circuit 100 is suitable for conducting a current from a voltage source Ue that can be connected to a circuit input 102 to a consumer Ua that can be connected to a circuit output 104. The circuit 100 is also suitable for limiting the current to an allowable maximum current. To this end, there is provided a transistor 106, wherein the current flow between circuit input 102 and circuit output 104 flows across the collector-emitter path to the transistor 106. In the normal operation, a series resistor 108, which is disposed between the circuit input 102 and the base of the transistor 106, delivers the base current needed for through-connecting the transistor 106. An exemplary dimensioning of the series resistor 108 is in the range of few kilo-ohms, e.g., 1.5 to 3 kohm.

A measuring resistor 110 is disposed between the emitter of the transistor 106 and the circuit output 104. A typical dimensioning for the measuring resistor 110 is in the range of few ohms, e.g., approximately 10 ohm. Two branches 112, 114 of a voltage tap for detecting the voltage drop across the measuring resistor 110 are connected on respective sides of the measuring resistor 110.

The tap branch 112 disposed on the input side of the measuring resistor 110 is connected to the reference input of a shunt regulator 116, which can also be called a controllable diode 116. The tap branch 114 disposed on the output side of the measuring resistor 110 is connected to the anode of the shunt regulator 116. The cathode of the shunt regulator 116 is connected to the base of the transistor 106. A component obtainable from Semiconductor Components Industries, LLC under the designation TLV413A is suitable as shunt regulator, for example. To this extent, the circuit 100 according to the invention corresponds to the already explained generic circuit 200.

According to the invention and in contrast to the state of the art, the circuit 100 is expanded by an additional, comparably high-ohmic current path, which bypasses the transistor 106 between the circuit input 102 and the measuring resistor 110. The key piece of the additional current path is an additional shunt regulator 118, which is connected reverse-biased in parallel to the transistor 106. In the represented embodiment, its reference input is back-coupled to its cathode. In the represented embodiment, an auxiliary series resistor 120a is connected upstream and an auxiliary measuring resistor 120b is connected downstream to the additional shunt regulator 118, wherein the latter resistor is integrated into the voltage tap branch 112. For sake of example, a component made by Semiconductor Components Industries, LLC that can be obtained under the designation TLV431A is suitable as the additional shunt regulator. Typical dimensionings of the resistors 120a and 120b are, e.g., several kohm for the auxiliary series resistor 120a, e.g., 4.7 kohm, and several 100 ohm for the auxiliary measuring resistor 120b, e.g., 380 ohm.

In normal operation, i.e., when the current requirement of the consumer is of a typical and non-critical order of magnitude, the required current flows across the collector-emitter path of the transistor 106 and the measuring resistor 110. The voltage drop across the measuring resistor 110 is detected by the shunt regulator 116 across the tap branches 112, 114. During normal operation, the reference voltage of the shunt regulator 116 is below the tapped voltage, so that no current flows to its cathode. The auxiliary measuring resistor 120b is "invisible" to the shunt regulator 116 because, due to the high impedance of the reference input of the shunt regulator 116, almost no current flows through the auxiliary measuring resistor 120b, which could effect a measurable change in the detected voltage drop.

In the event of a disproportionate current requirement (larger than the set maximum current), e.g., when there is a short circuit in the consumer, the voltage drop across the transistor 106 rises. The voltage drop across the additional shunt regulator 118 rises accordingly and is detected between its anode and reference input. As soon as the voltage drop detected by the additional shunt regulator 118 exceeds a predefined reference voltage of the additional shunt regulator 118, an event which will favorably occur when the maximum allowable current is flowing, the additional shunt regulator will connect through, so that a current flows through the resistors 120a and 120b. The current flow through the auxiliary measuring resistor 120b results in a voltage drop which, from the "view" of the first shunt regulator 116, adds to the voltage drop detected across the measuring resistor 110. The first shunt regulator 116 accordingly strongly controls the base of the transistor 106 to a reduced current below the allowable maximum current. The current through the transistor 106 and therefore its power consumption are reduced to a constant size that is permanently tolerable to the transistor 106. In the event of a permanent short circuit due to a defect in the consumer, the transistor 106 is not in danger of blowing out. If the short circuit is only short-term, the circuit 100 will immediately transition back into the normal operation at the end of the short circuit, namely when the voltage drop across the additional shunt regulator 118 again falls below its reference voltage. It is then not necessary in particular to perform maintenance work on the current-limiting circuit 100, as would be necessary in the case of an emergency opening of the mechanical switch, due to a thermosensor signal for example.

Figure 3:
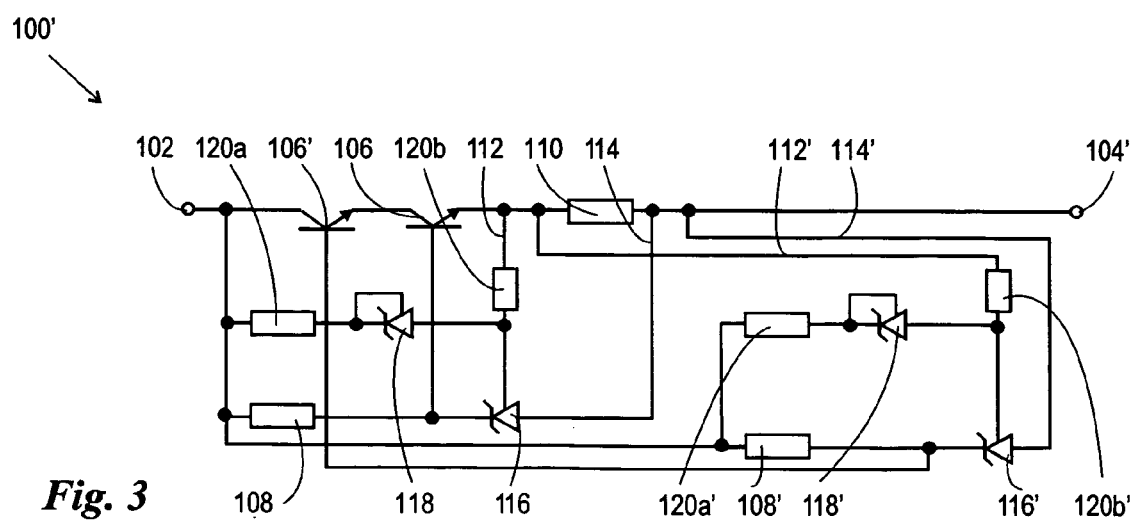
FIG. 3 shows a duplicate connected current-limiting circuit.

FIG. 3 shows a particularly preferable embodiment of the present invention, in which essentially two circuits according to FIG. 1 are serially connected in series. The reference numerals chosen in FIG. 3 correspond to those in FIG. 1, wherein the elements of the second circuit are designated with a "'". In contrast to a pure series connection of two identical circuits according to FIG. 1, the two subcircuits of the circuit system of FIG. 3 use the measuring resistor 110 in common. That is, the voltage taps 112/114 and 112'/114' tap the voltage drop across the mutual measuring resistor 110 in parallel and feed the measured voltage to their respective subcircuits. The provision of two independent current-limiting circuits, which is required in the operation of electrical consumers in explosion-prone environments, is satisfied in this manner without doubling the power loss with the subcircuits.

Of course, the embodiments discussed in the detailed description and shown in the figures represent only illustrative embodiments of the present invention. In view of the present disclosure, the person skilled in the art has been given a broad spectrum of variation options. In particular, the dimensioning and choice of the single components can be customized to the special case of interest. It is also understood to the person skilled in the art that the elements of the represented equivalent circuit diagram do not necessarily have to agree with the structural elements of a real circuit. In particular, resistors shown as single elements can for example actually consist of a large number of suitably connected single components. Additional elements, such as capacitors to prevent oscillations or for buffering voltage peaks, can also be introduced into the circuit for example without deviating from the present invention.

The above description of specific embodiments has been given by way of example. From the disclosure given, those skilled in the art will not only understand the present invention and its attendant advantages, but will also find apparent various changes and modifications to the embodiments disclosed. The applicant seeks, therefore, to cover all such changes and modifications as fall within the spirit and scope of the invention, as defined by the appended claims, and equivalents thereof.

What is claimed is:

1. A current-limiting circuit, which limits an electrical current from a voltage source to a consumer to a predetermined maximum current, comprising
  a measuring resistor coupled into a current lead between a circuit input and a circuit output,
  a transistor, which is coupled into the current lead with a collector-emitter path in series with the measuring resistor and a base connected to the current lead through a series resistor,
  a shunt regulator with an anode, a reference input and a cathode, wherein the cathode is connected to the base of the transistor, and the anode and the reference input form a voltage tap across the measuring resistor, and an additional, high-ohmic current path that is in parallel to the transistor and comprises:
  a component connected reverse-biased and having a diode characteristic and
  an auxiliary measuring resistor,
wherein the auxiliary measuring resistor is integrated in the voltage tap.

2. The circuit according to claim 1, further comprising an auxiliary series resistor connected upstream to the component having the diode characteristic.

3. The circuit according to claim 1, wherein the component having the diode characteristic is a Z diode.

4. The circuit according to claim 1, wherein the component having the diode characteristic is a further shunt regulator.

5. The circuit according to claim 4, wherein:
  the further shunt regulator comprises a cathode and a reference input, and
  the reference input of the further shunt regulator is back-coupled to the cathode.

6. The circuit according to claim 1, wherein the measuring resistor comprises at least one of a wire-wound resistor and a metal-film resistor.

7. A circuit system comprising:
  a measuring resistor coupled into a current lead between a circuit input and a circuit output;
  a first current-limiting circuit comprising:
    a transistor, which is coupled into the current lead with a collector-emitter path in series with the measuring resistor and a base connected to the current lead through a series resistor,
    a shunt regulator with an anode, a reference input and a cathode, wherein the cathode is connected to the base of the transistor, and the anode and the reference input form a voltage tap across the measuring resistor, and
    an additional, high-ohmic current path that is in parallel to the transistor and comprises a component connected reverse-biased and having a diode characteristic and an auxiliary measuring resistor, wherein the auxiliary measuring resistor is integrated in the voltage tap; and
  a second current-limiting circuit comprising:
    a transistor, which is coupled into the current lead with a collector-emitter path in series with the measuring resistor and a base connected to the current lead through a series resistor,
    a shunt regulator with an anode, a reference input and a cathode, wherein the cathode is connected to the base of the transistor, and the anode and the reference input form a voltage tap across the measuring resistor, and
    an additional, high-ohmic current path that is in parallel to the transistor and comprises a component connected reverse-biased and having a diode characteristic and an auxiliary measuring resistor, wherein the auxiliary measuring resistor is integrated in the voltage tap;
  wherein the collector-emitter paths of the respective transistors of the first and second current-limiting circuits are connected to one another in series and wherein the voltage taps formed by the anodes and reference inputs of the respective circuits tap the voltage drop across the measuring resistor.

* * * * *